March 10, 1970　　　R. T. SHANAHAN　　　3,500,155
INDUCTION MOTOR WITH FREE WHEELING ROTOR AND BRAKE FOR
SELECTIVELY BRAKING SAME
Filed June 13, 1967
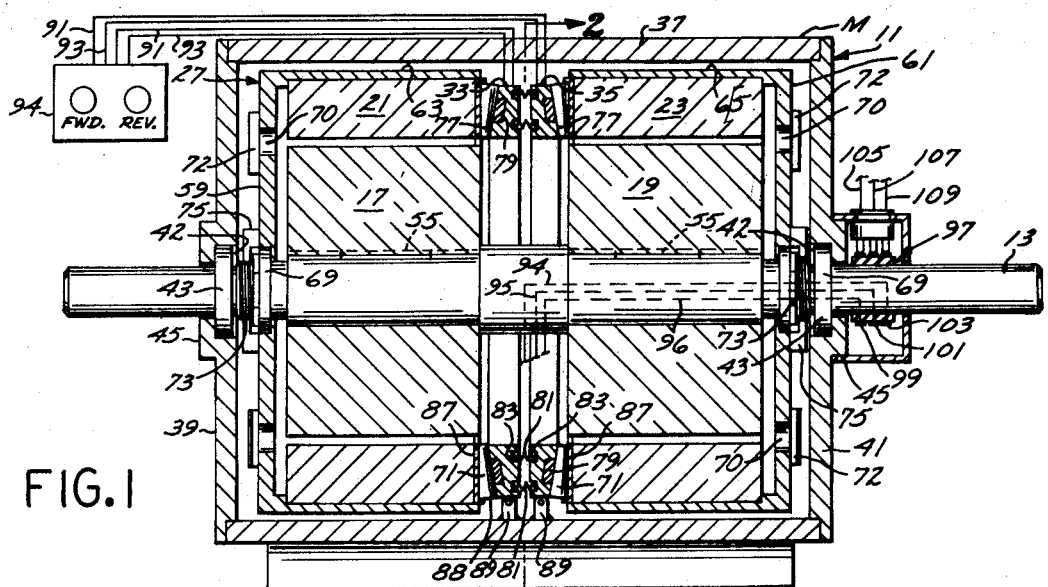
FIG.1
FIG.2
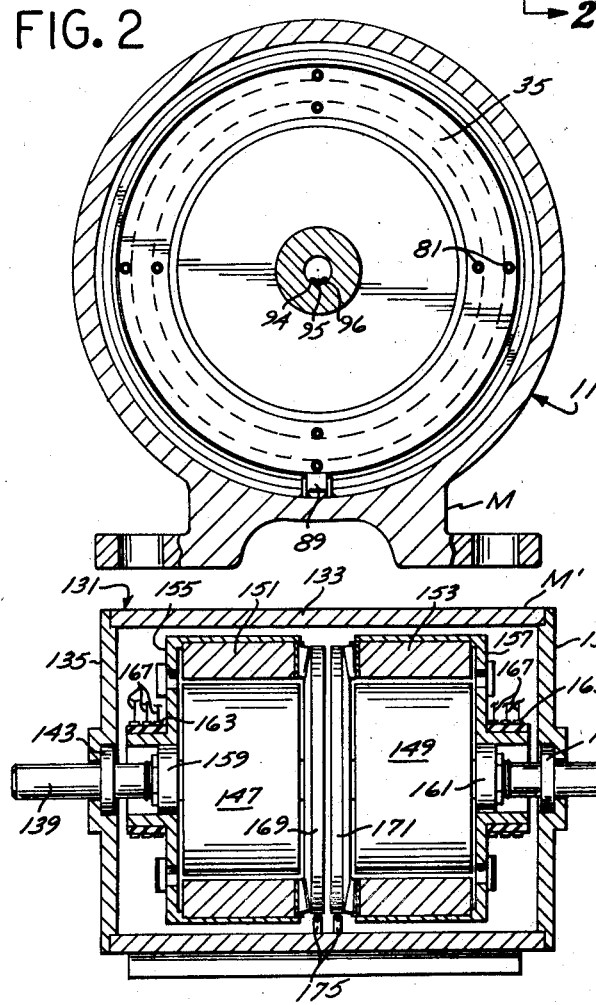
FIG.3
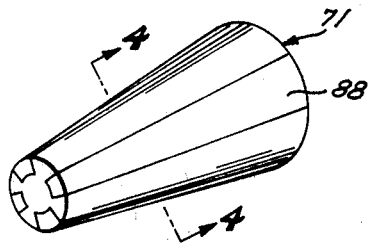
FIG.4
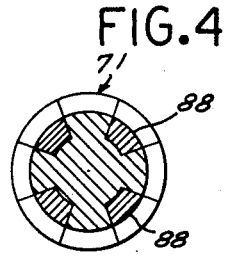
FIG.5
INVENTOR.
ROBERT T. SHANAHAN
BY *Fulwider, Patton, Rieber,*
*Lee and Utecht*
ATTORNEYS United States Patent Office 3,500,155
Patented Mar. 10, 1970

3,500,155
INDUCTION MOTOR WITH FREE WHEELING ROTOR AND BRAKE FOR SELECTIVELY BRAKING SAME
Robert T. Shanahan, 4208 Ransom St., Long Beach, Calif. 90804
Filed June 13, 1967, Ser. No. 645,722
Int. Cl. H02k 17/36
U.S. Cl. 318—48     11 Claims

ABSTRACT OF THE DISCLOSURE

A reversible motor comprising a stationary housing having a horizontal drive shaft journaled therein. A pair of armatures are carried on and keyed to the shaft, one armature being wound in one direction and the second being wound in the opposite direction. A pair of cooperating squirrel cages are carried freely rotatable on the shaft and have their proximate ends spaced apart for defining a brake receiving space. An electromagnetic brake ring is disposed in the brake receiving space. A set of roller bearings made of ferromagnetic material is interposed between one of the squirrel cages and the electromagnetic brake ring and means is provided for controlling current flow through such brake ring to vary the polarity of the bearings thereby controlling their resistance to rolling.

BACKGROUND OF INVENTION

Field of invention

The present invention realtes to reversible motors and more particularly to a reversible AC motor.

Description of prior art

Most known AC motors are incapable of being reversed easily.

SUMMARY OF INVENTION

The present invention relates to a reversible motor which includes a pair of armature-rotor assemblies mounted on a common shaft, with the respective armatures of the assemblies being wound in opposite directions, and wherein the armature or the rotor element of each assembly is selectively braked to control the rotation of the other element of such assembly and the shaft.

Other features and the advantages of the present invention will be apparent from the following description, reference being had to the accompanying drawing wherein a preferred embodiment of the invention is illustrated.

IN THE DRAWINGS

FIG. 1 is a longitudinal vertical sectional view of one embodiment of the motor of the present invention;

FIG. 2 is a vertical sectional view taken along the line 2—2 of FIG. 1 but showing the entire cross section of the motor;

FIG. 3 is a perspective view, in enlarged scale, of a bearing utilized in the motor shown in FIG. 1;

FIG. 4 is a tranverse sectional view, taken along the lines 4—4 of FIG. 3; and

FIG. 5 is a longitudinal vertical sectional view of a second embodiment of the motor of present invention.

Referring to FIG. 1, a motor M embodying the present invention includes a cylindrically shaped stationary housing, generally designated 11, through which is journaled a drive shaft 13. A pair of armatures, generally designated 17 and 19, are supported on and keyed to the shaft 13. The armatures 17 and 19 are wound in opposite directions to cause them to exert opposite torques on the shaft 13. A pair of annular rotors, generally designated 21 and 23, surround the circumferential peripheries of the respective armatures 17 and 19 and are freely rotatable upon the shaft 13 by means of a pair of frames, generally designated 27 and 29. A pair of electromagnetic brake rings, generally designated 33 and 35, are disposed between the proximate ends of the rotors 21 and 23 for effecting selective braking of the respective rotors to selectively control the torque imparted to the associated armatures and consequently control the speed and direction of rotation of the shaft 13 to which the armatures are keyed.

Referring particularly to FIG. 1, the housing 11 includes a cylindrical shell 37 and a pair of end plates 39 and 41. The end plates 39 and 41 each include a central bore for passage of the shaft 13 and have annular recesses 42 formed at the inner extremities of the bores for receiving ball bearing assemblies 43. The shaft 13 is carried in the bearing assemblies 43 and such assemblies are held in the rescesses 42 by bearing caps 45 formed integrally with the respective plates 39 and 41. The armatures 17 and 19 are keyed to the shaft 13 by keys 55.

The rotor frames 27 and 29 include circular vertical end plates 59 and 61 which support integral cylindrical shells 63 and 65, respectively. The end plates 59 and 61 include central bores for passage of the shaft 13, and outwardly facing recesses 67 are formed annularly of the bores for receiving ball bearing assemblies 69. A plurality of ventilating ports 70 are included in the plates 59 and 61 and afford communication between the outside of the frames 27 and 29. Air scoops 92 are mounted immediately adjacent the ports 70 for ventilation of the spaces adjacent the armatures.

Two sets of tapered roller bearings 71 are interposed between the proximate ends of the rotors 27 and 29 and the rings 33 and 35, respectively. The bearings 71 enable free rotation of the rotors with respect to the brake rings, and are made of ferro-magnetic material. As will be seen, polarization of the bearings 71 opposite that of the electromagnetic brake rings 35 and 33 effects a braking action.

The shaft 13 includes reduced diameter extremities which each have a threaded portion 73 adjacent the outside of the associated end plate 59 or 61. Rotor bearing lock nuts 75 are mounted to the threads 73 to press the rotors together, thereby preventing the rotors from tilting around their bearing assemblies 69. That is, since the rings 33 and 35 and bearings 71 fully occupy the space between the proximate ends of the rotors, the proximate ends of the rotors cannot tip downwardly but will serve to support one another.

The annular brake rings 33 and 35 are made from ferromagnetic material and the outer faces 77 slope toward each other in a radially outward direction, at a taper complementing the taper of the bearings 71. An annular groove is formed in the face 77 for receiving the windings 79. A plurality of compression springs 81 are interposed between the rings 33 and 35, and are equally spaced about their peripheries. The ends of the springs are received in blind bores 83 provided in the facing surfaces of the rings. The bias of the springs 81 urge the rings 33 and 35 axially outwardly away from one another, thereby exerting an axially outward force against a pair of sole plates 87 affixed to the proximate ends of the rotors.

The bearings 71 are made generally of ferromagnetic material to enable polarization, but preferably include elongated, radially extending inserts 88 of non-magnetic material. The inserts 88 terminate outwardly of the center of the bearings 71 and are spaced from one another to define flux paths between them. These paths extend radially inwardly from the periphery of one ferro-magnetic section and then turn and extend radially outwardly through another such section. It has been found that such an arrangement enhances the braking characteristics of a brake utilizing this feature by about 25% and it is believed that such enhancement results from concentration of flux in the defined paths.

The brake ring magnets 33 and 35 are prevented from rotating by anchorage to the housing 11. More particularly, lugs on the magnets and trunnions on the housing 11 are pinned together to define a pair of anchors 89 which hold the magnets 33 and 35 in place.

A pair of electrical leads 91 and 93 extend from the respective ones of the pair of windings 79 and connect with a conventional current control unit 74, which in turn, is connected with a power source.

The armatures 17 and 19 are conveniently wound for three phase operation. The shaft 13 includes an axial passage for accepting three leads 94, 95 and 96 to carry current to power the armatures. The leads 94, 95 and 96 are connected with a slip ring assembly, generally designated 97, which includes three slip rings 99, 101, and 103 in communication with source leads 105, 107 and 109, respectively.

In operation, power from a suitable power source passes through the leads 105, 107 and 109 and energizes the oppositely wound armatures 17 and 19. The armatures 17 and 19 impose opposite torques on the squirrel cages or rotors 21 and 23. It will be clear that if the opposite torques imposed on the armatures 17 and 19 are equal in magnitude there will be no resultant rotation of the shaft 13.

When rotation of the shaft 13 in one direction or the other is desired, the appropriate electro-magnetic brake ring 33 or 35 is energized through the associated leads 91 and 93 to polarize the adjacent set of bearings 71. Such polarization in the bearings 71 will cooperate with the polarity of the adjacent sloped brake surface 77 to create a torque in the individual bearings which effects resistance to further turning and consequent braking of the associated squirrel cage or rotor 27 or 29. Such braking will slow the braked rotor 27 or 29 and, assuming rotor 27 is braked, in order for its associated armature 17 to maintain its synchronous speed the armature will be urged to speed up thus turning the shaft 13 more rapidly. Any desired change of speed can be accomplished by increasing the current to the appropriate braking ring 33 or 35 which will brake the associated rotor and alter the speed of the cooperating armature 17 or 19.

To change the direction of rotation of the motor M, assuming that rotor 27 has been braked to effect the corresponding shaft rotation, the current to the brake magnet 33 is discontinued. If nothing more is done, the rotors will again assume their equal and opposite rotational speeds, thereby applying equal and opposite torques on the armatures 17 and 19 to discontinue rotation of the shaft 13. However, by energizing the electromagnetic brake ring 35, the adjacent tapered bearings 71 will be polarized to resist rotation and the rotor 23 will be braked causing the associated armature 19 to speed up sufficiently to sustain the synchronous speed. Again, variance of the current through the brake 35 can be effected to vary the speed of the shaft 13.

While this discussion has been directed to a motor M including two brake rings 33 and 35, it will be apparent that drive shaft reversal could be accomplished with a motor embodying the present invention but including only one brake ring. As an illustration, the armature 17 could be wound so that in its unbraked condition it will effect more torque on the shaft 13 than the armature 19, thereby rotating the shaft in the direction of such torque during free rotation. Gradual braking of the rotor 23 associated with the low torque armature would then gradually increase the torque on the armature 17 to reduce the shaft speed until the shaft 13 stopped. Further braking beyond that point would reverse the shaft. In addition, the armatures 17 and 19 could be wound in the same direction to provide speed control in only that direction. With such an arrangement, the brake rings 33 and 35 would still provide for the support of the proximate ends of the rotors 21 and 23 and would, also, provide the inherent positive braking action.

Referring now to FIG. 5, wherein a second motor M' which embodies the present invention is shown, the stationary housing, generally designated 136, is similar to the above-described housing 11 and includes a cylindrical shell 133 and a pair of end plates 135 and 137. The end plates 135 and 137 include central horizontal bores for receiving a pair of drive shafts 139 and 141, respectively, and such end plates include annular recesses on the inner ends of the shaft receiving bores for accepting respective shaft supporting ball bearing assemblies 143 and 145.

The inner ends of the shafts 139 and 141 are affixed to, and cooperate to carry, a pair of rotors 147 and 149, respectively. A pair of oppositely wound armatures 151 and 153 surround the circumferential periphery of the rotors 147 and 149 and are secured to the frames 155 and 157, respectively, similar to above-described frames 27 and 29. The frames 155 and 157 are carried rotatably on the respective shafts 139 and 141 by means of ball bearing assemblies 159 and 161, respectively. Three-wire slip ring assemblies 163 and 165, respectively, are mounted on the respective hub of the armature frames 155 and 157 and receive current from leads 167 for the respective armatures.

Electro-magnetic brake rings 169 and 171, similar to brake rings 33 and 35, are interposed in the space between the proximate ends of the armatures 151 and 153 and are anchored to the housing 131 by anchor fittings 175. Ferromagnetic tapered bearings 177 are interposed between the respective rings 169 and 171 and the respective armatures 151 and 153 to provide for free rotation of the armatures and braking thereof by the rings.

From the above description, it will be apparent that operation of the motor M' is similar to that of the aforedescribed motor M. That is, since the armatures 151 and 153 are oppositely wound, they will cooperate with the respective rotors 147 and 149 to impart oppositely directed torques on the connected shafts 139 and 141. Assuming that the torque on the rotors 147 and 149 is initially equal, braking of either of the armatures 151 or 153 will cause the torque on the associated rotor 147 or 149 to be increased and the shafts 139 and 141 will be urged to rotate in the direction of that torque. Thus, the motor M' can be reversed and the speed in either direction controlled.

From the above, it will be clear that the reversible motor of this invention is of practical design, economical to the manufacture and use, and will respond rapidly to desired speed changes. The reversibility and speed control is accomplished electrically, thus increasing the reliability of the motor and enabling the use of components which do not require expensive close tolerance machining. In addition, the brake rings and associated ferro-magnetic bearing provide a positive braking action and also assist in supporting the proximate ends of the rotors.

Various modifications and changes may be made with regard to the foregoing detailed description without departing from the spirit of the invention or the scope of the following claims.

I claim:
1. A reversible motor comprising:
   a stationary housing;
   a drive shaft journaled in said housing;
   a pair of armature elements, one of said armature elements being wound in one direction and the other of said armature elements being wound in the opposite direction;
   a pair of rotor elements in electrical inductive relationship with said pair of armature elements;
   means coupling one pair of said pairs of armature and rotor elements to said shaft for common rotation with said shaft;

means for mounting the other pair of said pairs of armature and rotor elements for independent rotation in opposite directions about said shaft;

braking means operative to selectively brake at least one of the elements of said other pair of elements which are rotatable about said shaft to thereby increase the rotational force on said one of the elements.

2. A reversible motor as set forth in claim 1, wherein said armature elements are coupled to said shaft for common rotation with said shaft, and said rotor elements are mounted for rotation about said shaft.

3. A reversible motor as set forth in claim 1, wherein said pair of rotor elements are coupled to said shaft for common rotation therewith and said armature elements are mounted for independent rotation about said shaft.

4. A reversible motor as set forth in claim 1, wherein said braking means is adapted to selectively brake both of said other pair of elements.

5. A reversible motor as set forth in claim 1, wherein said braking means includes:

a pair of axially elongated mounted frames mounted at their axially outward extremities on said shaft and carrying said other pair of elements on their adjacent portions; said other pair of elements having their proximate ends spaced from one another to define a brake means receiving space;

locking means having portions on said shaft and said frames which cooperate to limit axial outward movement of said pair of frames; and wherein said braking means is interposed in said receiving space, whereby said proximate ends of said other pair of elements transmit force therethrough and to each other to cooperate with said locking means to provide support for said proximate ends of said other said pair of elements.

6. A reversible motor as set forth in claim 1, wherein said braking means is electro-magnetic and includes:

a first electro-magnetic ring shaped to complement the shape of one of the elements of said other pair of elements and supported by said stationary housing;

a first set of roller bearings interposed in bearing relationship between said first electro-magnetic ring and said one element of said other said pair of elements, said bearings including ferro-magnetic material;

means for controlling the current through said first ring for selectively varying the magnetic flux through said first set of bearings to control the rolling resistance of said bearings whereby selective braking of said one element of said other pair of elements is effected.

7. A reversible motor as set forth in claim 6, wherein said bearings include radially extending segments of non-ferro-magnetic material cooperating to define flux paths therebetween whereby the flux from said electro-magnetic ring is concentrated in said paths to increase the magnetic resistance to rolling of said bearings.

8. A reversible motor as set forth in claim 6, wherein said braking means includes:

a second electro-magnetic ring shaped to complement the shape of the other element of said other pair of elements and supported by said housing;

a second set of roller bearings interposed in bearing relationship between said second electro-magnetic ring and said other element of said other pair of elements, said bearings being of ferro-magnetic material;

means for controlling the current through said second ring for controlling the magnetic flux through said second set of bearings to thereby control the rolling resistance of said bearings whereby selective braking of said other said element of said other pair of elements is effected.

9. A reversible motor as set forth in claim 8, wherein said first and second rings are disposed adjacent one another and wherein said braking means includes a plurality of compression springs interposed between said first and second rings for urging said respective rings toward the proximate ends of said other pair of said elements to support said proximate ends.

10. An electro-magnetic brake for controlling movement of a movable member having a bearing surface, said brake comprising:

a stationary electro-magnet disposed adjacent said member and having a bearing surface made of ferro-magnetic material facing said bearing surface of said movable member;

a plurality of roller bearings disposed in bearing relationship between said bearing surfaces, said bearings being characterized in that they include segments of ferro-magnetic material whereby their polarization caused by the magnetic field set up by said electro-magnet cooperates with the polarization set up in said bearing surface of said electro-magnet to resist rotation of said bearings and cause frictional resistance between said bearings and said movable member, thereby resisting movement of said moveable member.

11. An electro-magnetic brake as set forth in claim 10, wherein each of said roller bearings includes a plurality or radially extending segments of non-ferro-magnetic material cooperating to define flux paths therebetween, whereby the flux effected by said electro-magnet is concentrated in said paths to increase the magnetic resistance to rolling of said bearings.

References Cited

UNITED STATES PATENTS

| | | | |
|---|---|---|---|
| 2,309,904 | 2/1943 | Hunsdorf | 318—214 XR |
| 2,378,601 | 6/1945 | Volk | 318—48 XR |
| 2,596,654 | 5/1952 | Clark. | |
| 2,787,747 | 4/1957 | Drummond | 318—214 XR |
| 3,026,459 | 3/1962 | Moore | 318—243 XR |
| 3,034,028 | 5/1962 | Jamieson | 318—48 XR |
| 3,290,574 | 12/1966 | Roe | 318—214 |
| 3,383,576 | 5/1968 | Kordik | 318—214 |

ORIS L. RADER, Primary Examiner

A. G. COLLINS, Assistant Examiner

U.S. Cl. X.R.

318—214